United States Patent
Gousseinov et al.

(10) Patent No.: US 9,038,996 B2
(45) Date of Patent: May 26, 2015

(54) SPRING WITH ADJUSTABLE SPRING CONSTANT

(76) Inventors: Rouslan Gousseinov, Monroe, NY (US); Eldar Guseynov, Fryazino (RU)

( * ) Notice: Subject to any disclaimer, the term of this patent is extended or adjusted under 35 U.S.C. 154(b) by 424 days.

(21) Appl. No.: 13/373,823

(22) Filed: Dec. 2, 2011

(65) Prior Publication Data

US 2013/0043629 A1    Feb. 21, 2013

Related U.S. Application Data (60) Provisional application No. 61/575,001, filed on Aug. 15, 2011.

(51) Int. Cl.
    *F16F 1/12* (2006.01)

(52) U.S. Cl.
    CPC . *F16F 1/12* (2013.01); *F16F 1/121* (2013.01); *F16F 2230/0064* (2013.01)

(58) Field of Classification Search
    CPC ...... F16F 1/12; F16F 1/121; F16F 2230/0064
    USPC .......................... 267/172, 173, 175, 177, 131
    See application file for complete search history.

(56) References Cited

U.S. PATENT DOCUMENTS

| | | | | |
|---|---|---|---|---|
| 2,714,002 A | * | 7/1955 | Taylor | 267/248 |
| 3,552,695 A | * | 1/1971 | Liesegang | 248/589 |
| 4,006,873 A | * | 2/1977 | Berger | 248/613 |
| 5,944,288 A | * | 8/1999 | Whitney et al. | 248/58 |

FOREIGN PATENT DOCUMENTS

| | | | |
|---|---|---|---|
| SU | 1456731 A1 | * | 2/1989 |
| WO | WO 9719727 A1 | * | 6/1997 |

* cited by examiner

*Primary Examiner* — Robert S Siconolfi
*Assistant Examiner* — Charles Poon (57) ABSTRACT

A spring comprising a spring itself and end seat plates and a mount. In the spring seat plates are mechanically connected (constantly, variably, or actuable to connect) to each other and to the mount, so when a force or moment is applied to one of those seat plates its movement induce the movement of other seat plate as well, changing the total movement of the spring. Furthermore, there are provided mechanical means (a cams, a gears, a levers etc.) for changing the linkage between the end seat plates and the mount, which result in increasing, remaining the same (constant spring) or decreasing the spring constant. So, the spring constant of the spring can be controlled as to be adjustable.

2 Claims, 10 Drawing Sheets

*©2011 R&E.Gousseinov*

SPRING WITH ADJUSTABLE SPRING CONSTANT

CROSS-REFERENCE TO RELATED APPLICATIONS

The present application claims priority from U.S. application No. 61/575,001 filed on Aug. 15, 2011, the content of which is hereby incorporated into this application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to a spring hangers for supporting pipes, ducks and equipments, to suspension of a vehicle or any other area where springs usually use. The device allows avoiding any transfer of stress from support onto critical terminals or connecting equipment. In a vehicle it allows to regulate suspension's stiffness, depending on road conditions and drive and a frequency of a suspension deflection.

From U.S. Pat. No. 4,248,410 a suspension spring device having at least two suspension coil springs arranged in series between a vehicle body and wheels, the same interconnected through a spring adjusting cylinder disposed movably up and down relative to the body, and a lock device disposed on the body for restraining the upward and downward movements of the spring retaining cylinder. Depending of what springs are activated (lower one or both) the higher or lower spring constant are obtained.

U.S. publication US 20060131799 proposes a helical pressure spring assembly whose force action line deviates from the geometric spring center line. There is 3-dimensional adjustment of the force action line relative to the geometric spring line. The spring constant adjustment is obtained by changing the above deviation.

German Publications DE 3743450 C2 and DE 10125503 C1 propose a helical pressure spring in a wheel suspension whose force action lines form an angle with the spring central line. The deviation of the force action line from the spring central line in the built-in condition is achieved with the helical pressure springs in the untensioned condition in a radial view and follow an approximately S-shaped course. In a radial view, an S-shaped course is followed in a first view and a C-shaped course is followed in a second view extending perpendicularly relative thereto or an S-shaped course in a first view and, equally, an S-shaped view in a second view extending perpendicularly relative thereto.

U.S. Pat. No. 5,944,288 comprises a spring housing, a load spring disposed within the spring housing and bearing upon a trunnion plate, lever and spring tension rod. As the lever moves from the high to the low position, the load spring is compressed and the resulting increasing force acting on the decreasing spring moment arm creates a turning moment about the main pivot which is equal and opposite to the turning moment of the load and load moment arm.

U.S. Pat. No. 4,673,170 comprises four articulated arms which are interconnected by a compression (central) spring and extension spring perpendicular to the central spring. The arms pivotally connected at their ends and at the mid-points. The combination of those springs while acting together (one is compression, another extension springs) creates unique constant force mechanism.

A first two methods of adjusting the spring constant require electronic sensor means and also driving means in the form of a turning device with piston (U.S. Pat. No. 4,248,410) or an electric motor (US 20060131799) which require additional energy consumption. Beside that the above mentioned Helical Coin Springs have side forces which makes difficult using them. Also the spring rate adjusting possibilities are very limited (only two numbers in the first method).

In U.S. Pat. No. 5,944,288 constant spring when in a use the force action line deviates which is no good for such kind of devices. Beside that it requires two much space to install and to maintain the spring.

In U.S. Pat. No. 4,673,170 to achieve the goal two springs are used, which makes this mechanism too complicated.

BRIEF SUMMARY OF THE INVENTION

Object of the Invention

On the basis of the above-mentioned state of the art, it is the object of the present invention to provide a spring which improve the possibilities of adjusting the spring constant or making a single spring with constant spring rate. In this case the adjustment of a spring constant can be achieved using one spring both based on the data of an electronic sensor means or automatically, depending on a spring's preconditions.

The objective is achieved by providing a spring comprising a spring itself and an end seat plates. These seat plates are mechanically connected. So, when a force or moment is applied to one of those seat plates its movement induce the movement of other seat plate as well. As a result we change the total movement of a spring (making it higher or lower compare to a regular spring). In another words by applying the same force or moment to the same spring we have different movement of the top seat plate which gives us the "effect" of changing the spring constant.

Furthermore, there are provided mechanical means for changing the interaction between a seat plates at the ends of a spring, which result in increasing, remaining the same (constant spring) or decreasing the spring constant. So, the spring constant can be controlled as to be adjustable.

SUMMARY OF THE INVENTION

In a New Spring comprising a spring itself placed between a first and a second end seat plates and a spring mount the first seat plate at one end of the spring to which a force or moment is applied is mechanically connected (besides through the spring itself) to the second seat plate at another end of the spring. So, neither ends of the spring is rigidly fixed.

In a New Spring comprising a spring itself, a first and a second end seat plates, a third plate to which a force or moment is applied and a spring mount the first seat plate at one end of the spring is mechanically connected to the spring mount plate and the third plate, the second seat plate at another end of the spring is connected to or is the spring mount. So, only one end of the spring is rigidly fixed.

The main idea of the Invention is that a two ends of a spring are mechanically connected (constantly, variably or in steps) between each other and a spring mount plate, so when in a use the positions and locations of both ends of the spring and the way they acting between themselves and the spring mount are changing, resulting in increasing, remaining the same or decreasing the spring constant.

DETAILED DESCRIPTION OF THE PREFERRED EMBODIMENTS

In a regular spring (FIG. 1) spring 1 is located between a two seat plates (items 2 & 3), which are not connected (a spring itself is not considered). While in a use one of those plates is not moving (a top plate in an expansion spring, a bottom plate in a compression spring), so the total movement of a spring—"X1" is equal to the movement of one of those plates. In our example of a compression spring the bottom plate 3 is not moving (Y1=0) and resting on a fixed mount (load supporting member) 4.

In all related drawings "X" is a movement of a top seat plate, "Y" is a movement of a bottom seat plate.

Figure 1:
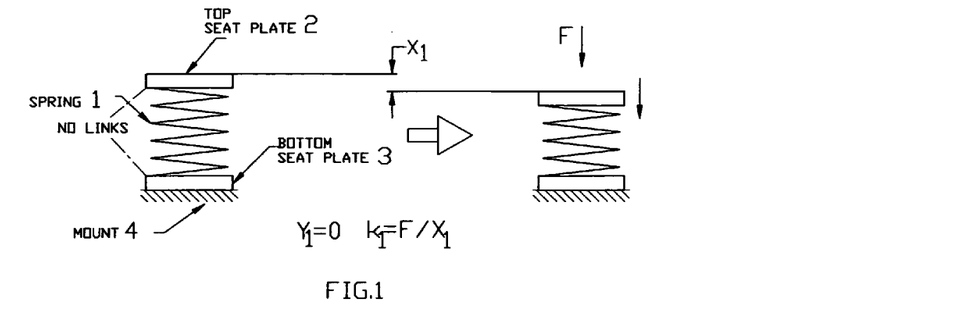
FIG. 1 shows a regular spring.

Spring constant of the spring is: k1=F/X1, where "F" is force exerted by the spring, "X1" is the distance the spring is stretched (movement of the top plate 2 only).

Figure 2:
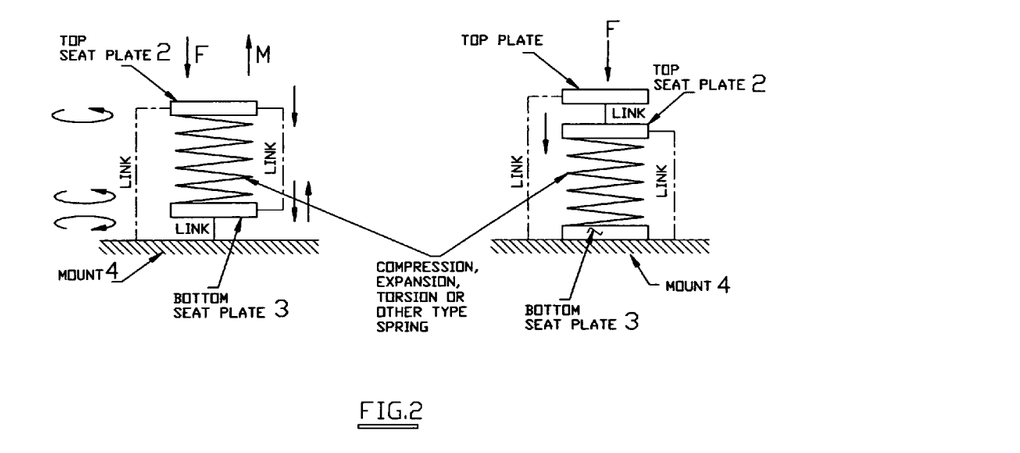
FIG. 2 shows the main ideas of the New Spring.

FIG. 2 shows the main ideas of the New Spring. In this springs both top and bottom seat plates and a mount are mechanically interconnected (constantly, variable or can be connected or disconnected), so when under a force or moment one of those seat plate (one end of the spring) moves (rotates) the movement (rotation) transfers to another seat plate (another end of the spring) changing the total movement of a spring. Also changing the way the seat plates and the mount are interacting.

Figures 3A, 3B:
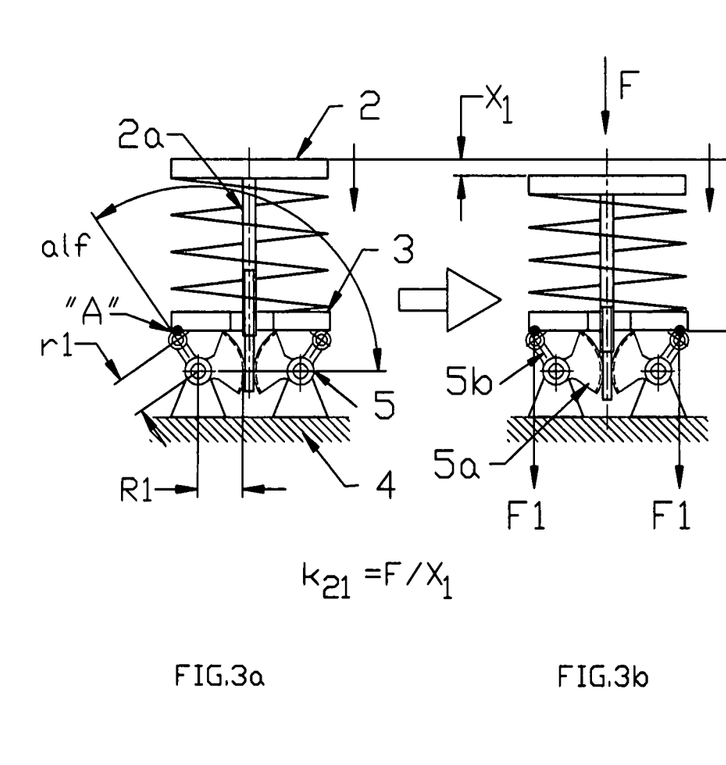
FIG. 3 is a view of the spring, according to the first embodiment of a spring, illustrating the first main idea of the Invention.
Figure 3C:
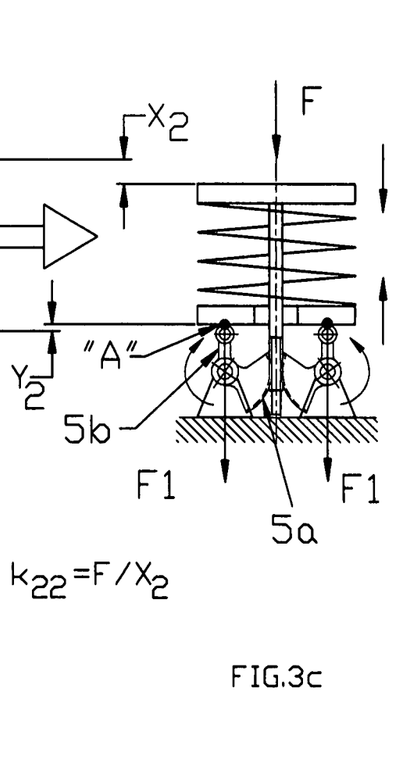

One example of implementing of the idea on an example of a compression spring is shown on FIG. 3. The top seat plate 2 is mechanically connected to the bottom seat plate 3 and to the mount 4. To do so the gear rack (part 2a) fixed to the item 2 and going through the hole in the bottom seat plate (item 3) and the levers 5 with a cogs on the arm 5a and rollers on the arm 5b are used. In this case when a force "F" is applied to the spring (FIG. 3b) the top plate 2 starts to move down. The cogs on the gear rack 2a and the arms 5a are not engaged yet, so the bottom seat plate is not moving. We have a regular spring with the spring constant—k21=F/X1, where "X1" is the movement of the top seat plate 2 only. At the moment, shown on FIG. 3b the cogs on the parts 2a and 5a start to engage. Now the parts 5b start to rotate, moving up the bottom seat plate 3 (FIG. 3c), changing the total movement of the spring. Now the spring constant is: k22=F/X2, where "X2" is the movement of the top seat plate 2. But the spring itself stretches to the distance "X2+Y2", where "Y2" is the movement of the bottom seat plate 3. In other words by applying the same force to the spring we have the different (less) movement of the top seat plate which gives us the "effect" of changing the spring constant. Beside that the location of the contacting points "A" between the arms 5b and the bottom seat plate 3 and accordingly the moments of the reaction forces F1 of the spring will also change, contributing to the change of the spring constant (On FIG. 3.b the moments of the forces F1 are max. and prevents the movement down of the top seat plate 2, on FIG. 3c these moments are zero). By choosing the moment of the cogs engagement and the radiuses "r1" & "R1" of the arms 5a and 5b and the angle "alf" between them we can achieve the desired changing of the spring constant "k" of the spring.

If we disconnect the top seat plate 2 from the part 5 we'll have a regular spring.

Figure 4:
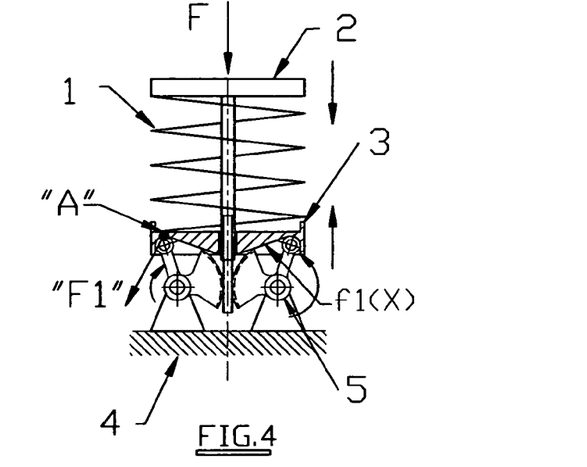
FIG. 4 is a view of the same spring with some modifications made.

FIG. 4 shows the modification of the spring. Seat plate 3 adjacent to the levers 5 with a cogs is made convex- "f1(X)". It allows to regulate the angle of interacting between the plate 3 and the arms 5a and 5b. That means, that with the deflection of the spring the reactions forces "F1" and their moments will change. Accordingly, will change the stiffness of the spring. It becomes further higher.

Figures 5, 5A, 5B:
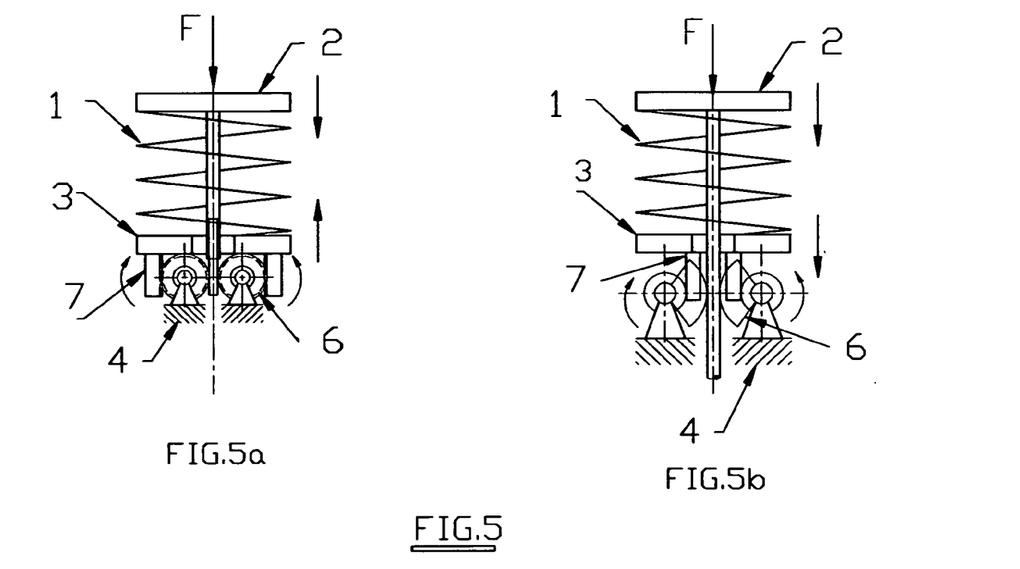
FIG. 5 shows the second embodiment of the Spring.

Another example of the New Spring is shown on FIG. 5, where to connect the top 2 and the bottom 3 seat plates gears 6 and gear racks 7 are used. When the top plate starts to move down the gears 6 start to rotate, moving up (FIG. 5a) or down (FIG. 5b) the bottom seat plate 3 and accordingly changing the spring constant.

In all these examples (except FIG. 5b) a top and a bottom seat plates of a spring move toward each other, so under the same force the movement of the top seat plate decreases. On FIG. 3 to FIG. 5 (except FIG. 5b) we see the increasing of a spring constant.

The important factor is an angle "alf" between the arms 5a and 5b. If it is less or equal than 180 degree but is more than 90 degree we will have the situation, shown on FIG. 3 and FIG. 4 when rotation of the levers 5 move the bottom seat plate up, increasing the spring constant.

Figure 6:
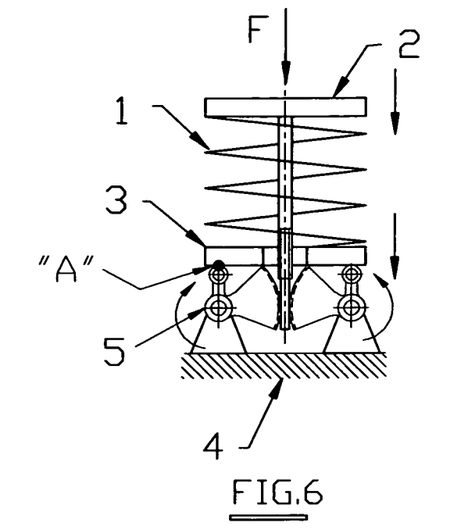
FIG. 6 is a view of the spring according to the third embodiment of the Invention.
Figure 7:
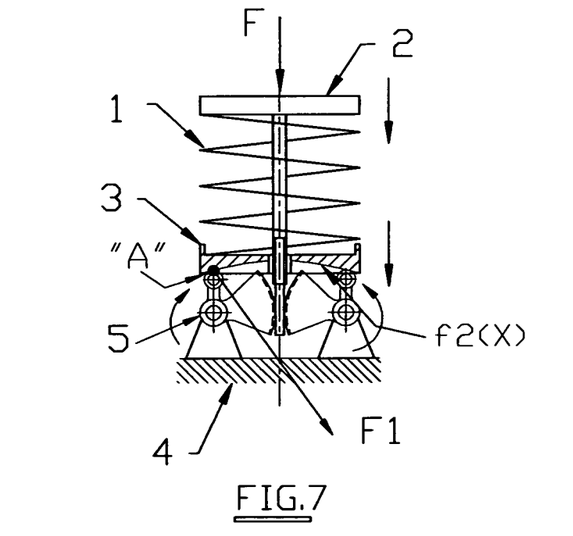
FIG. 7 is a view similar to FIG. 6, illustrating a modification made.

If we reduce the angle "alf" between the arms 5a and 5b when in an initial position it is less or equal to 90 degree we will have the situation shown on FIG. 6. Now when a force "F" is applied to the spring, the seat plates 2 & 3 move in the same direction (down). On FIG. 7, which is the modification of the spring on FIG. 6 seat plate 3 adjacent to the levers 5 with a cogs is made concave—"f2(X)". It allows us to change the location and the way of contacting (point "A") between the bottom seat plate and the mount part. In this embodiment of the spring the moment of the reaction forces "F1" push the top seat plate 2 down, decreasing the spring constant. So, by choosing the profile "f2(X)" we can control how to adjust the spring constant.

Figure 8:
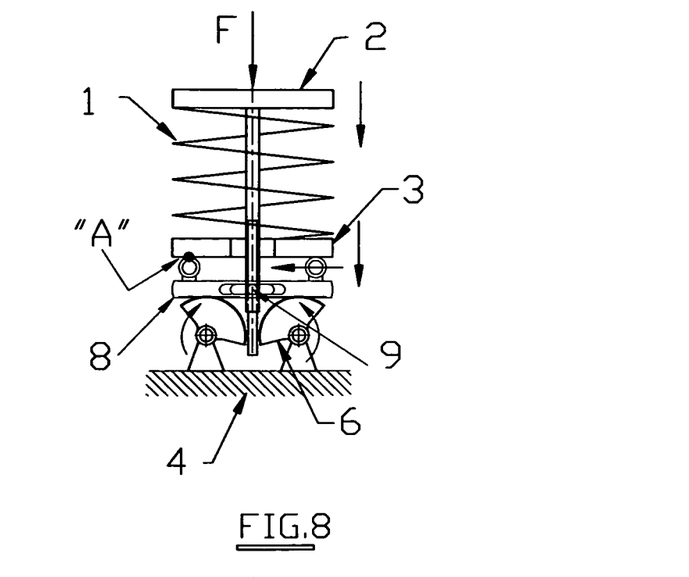
FIG. 8 is the forth embodiment of the Invention.

FIG. 8 illustrates the forth embodiment of the invention. In this embodiment when a force "F" is applied to the top seat plate 2 it starts to move down, cogs 6 start to rotate. As a result the gear racks 8 start to rotate around the pivot 9 and shift to the center of the spring. The bottom seat plate starts to move down, increasing the total movement of the top seat plate. The locations of the contacting point "A" at the bottom seat plate also will change. All this results in changing the spring constant.

Figure 9:
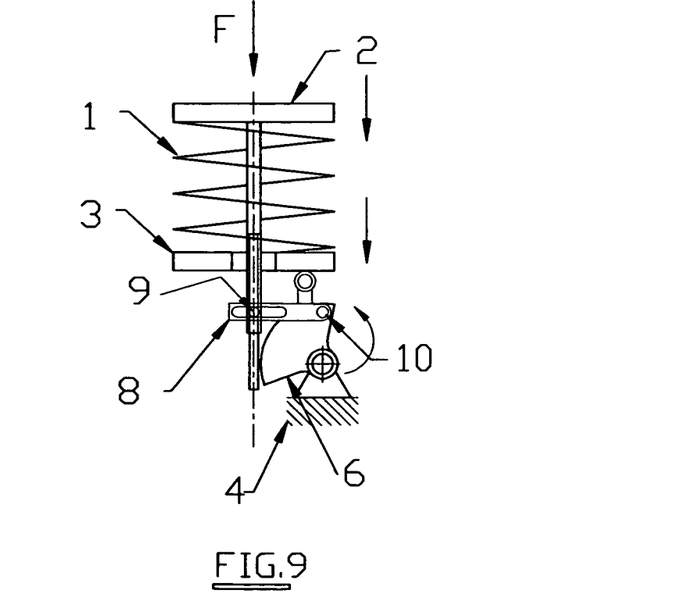
FIG. 9 shows a modification of the Spring, shown on FIG. 8.

FIG. 9 illustrates the modification of the Spring, shown on FIG. 8 (left parts 6, 8 and 10 omitted for the clarity of the illustration). In this embodiment when under a force "F" the top seat plate 2 starts to move down, cogs 6 will start to rotate. As a result items 8 start to rotate around pivots 9 and 10 and shift to the center of the spring. All these induce the changing of the movement of the top seat plate of the spring under the same force, which means the changing of the spring constant.

Figures 10, 10A, 10B, 10C:
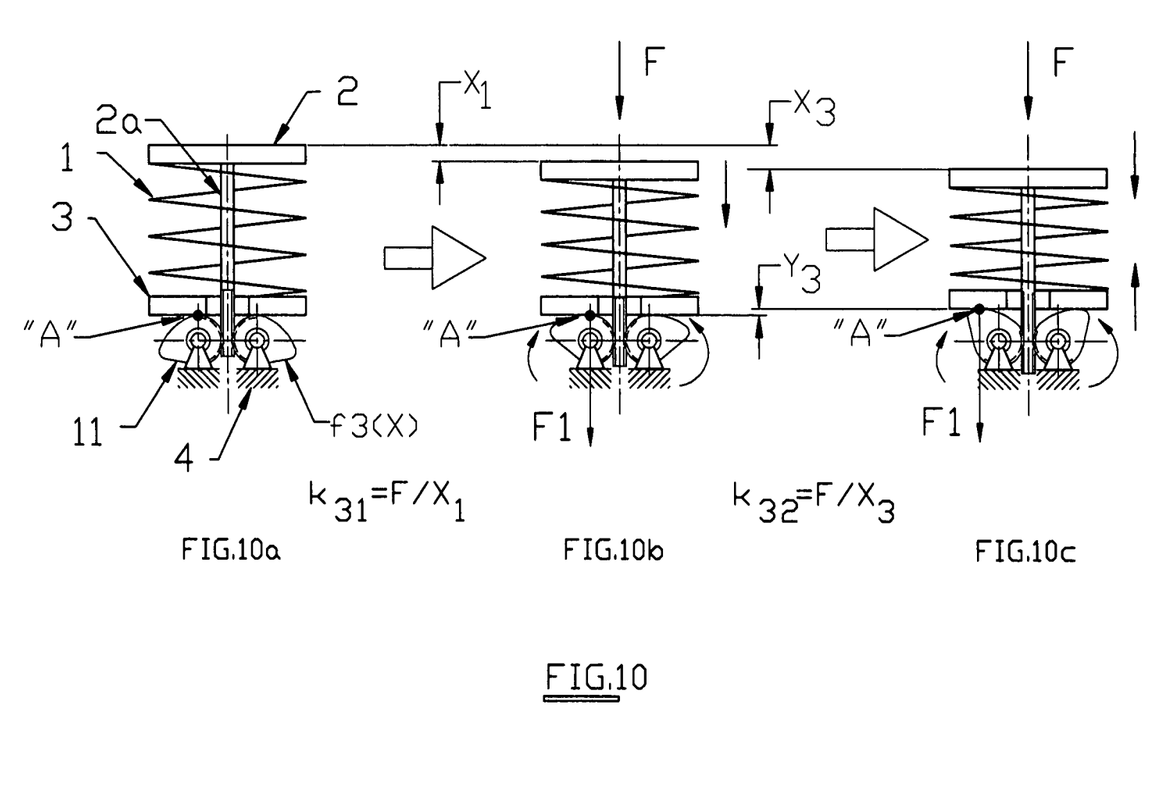
FIG. 10 is the fifth embodiment of the Invention, with smooth adjustment of the spring constant.

In all previous embodiments of the Invention the mechanical engagement between the top and the bottom seat plates occurs in steps. But in some cases it is necessary to have a smooth adjustment which increase the performance and reduce the dynamic forces in the system. On FIG. 10 shown how to achieve this goal. The top and the bottom seat plates are connected through the cams 11. Now the seat plates 2 and 3 connected constantly and adjusting of the spring constant is achieved by choosing the profiles "f3(X)" of those cams. On FIG. 10b when a force "F" is applied, the top seat plate 2 starts to move down which induce the rotation of the cams 11. While the profile of the cams is circular the contacting point "A" (bottom seat plate) is not moving (see FIG. 10b). In other words we have a "regular" spring. With the increasing of the applied force "F" the cams 11 continues to rotate. Radius of the contacting points of the cam starts to increase smoothly. Now the cams smoothly start to push the bottom seat plate 3 up (see FIG. 10c), changing the movements of the seat plates. Beside that the direction of the reaction forces shifts from the center apart, creating the moments, preventing the movement of the top seat plate 2. So, under the same force the movement of the top seat plate is less, and accordingly the spring constant of the spring is higher.

Figure 11:
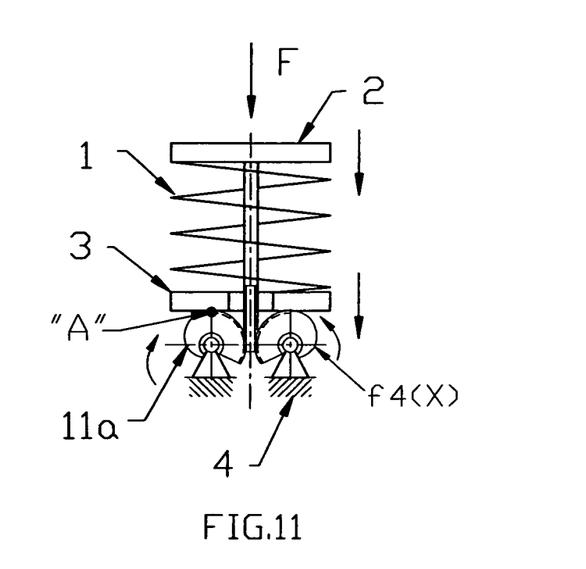
FIG. 11 shows a modification of the Spring, shown on FIG. 10.

On FIG. 11 is shown a modification of the spring, shown on FIG. 10. The cams 11a have a profile f4(X) which designed in a way that while they are rotates the radius of the contacting points "A" decrease. In this case both seat plates move in the same direction—down. The top seat plate moves to a bigger distance, making the spring constant lower.

In both cases, by choosing the profile of the cams we can achieve when and how to adjust the spring constant.

In all these examples (FIG. 3 to FIG. 11) both seat plates move. We have an effect that the base of a spring is not rigid, depending on the "stiffness" of the bottom seat plate the spring constant will change.

But we can achieve the adjusting of a spring constant even if one of the seat plates of a spring is fixed as in a regular spring.

Figure 12:
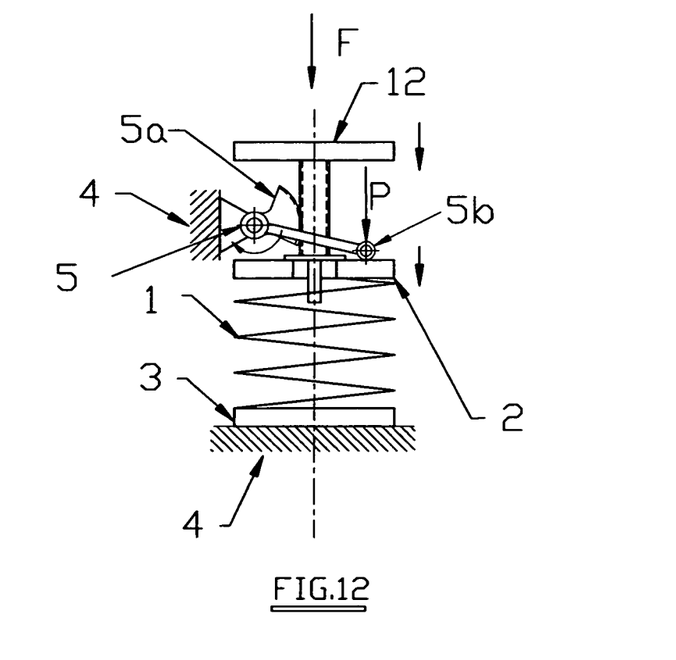
FIG. 12 shows the example of the embodiment of the New Spring, showing the second main idea of the Invention.

FIG. 12 shows the second main idea of the Invention. The force applies to the spring not directly but through another plate, mechanically connected to one of the seat plates of a spring through the mount.

The New Spring comprises a spring itself 1, a first (item 2) and a second (item 3) end seat plates, a third plate (item 12) to which a force is applies and a mount 4. The first seat plate at one end of the spring through the lever 5 is connected to the mount and to the third plate; the second seat plate at another end of the spring is or connected to the mount. So, one end of the spring (the bottom seat plate 3 in this embodiment) is rigidly fixed to the mount. When a force is applied to the third plate 12 it starts to move down, pushing the top seat plate 2 down. The spring works as a regular one. If the plate 12 is connected to the arms 5a and 5b they will start to rotate pushing down the seat plate 2. The radius of the part 5b is bigger than the radius of the part 5a. That means that the force "P" acting on the top seat plate is less than the force "F" applied to the spring which results in it's less movement. So, the spring constant increases. By choosing the length of the arms 5a and 5b we can control the significance of the spring constant adjustment.

All these examples of embodiment of the Invention, shown on FIG. 3 to FIG. 12 are for compression type of spring. But the ideas of the Invention work for other types of springs as well.

Figure 13:
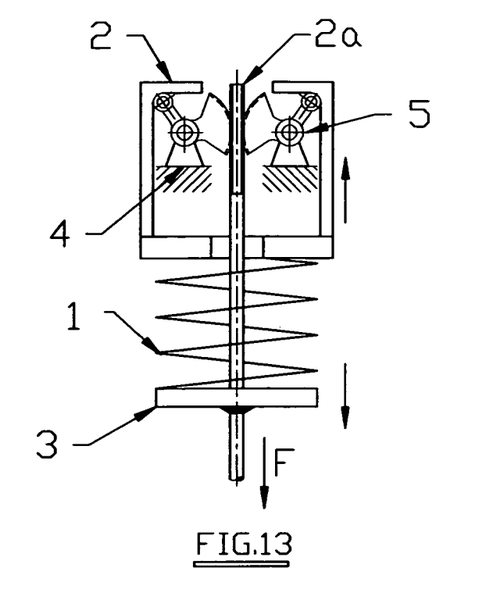
FIG. 13 is a view similar to FIG. 3 on an example of expansion spring.
Figure 14:
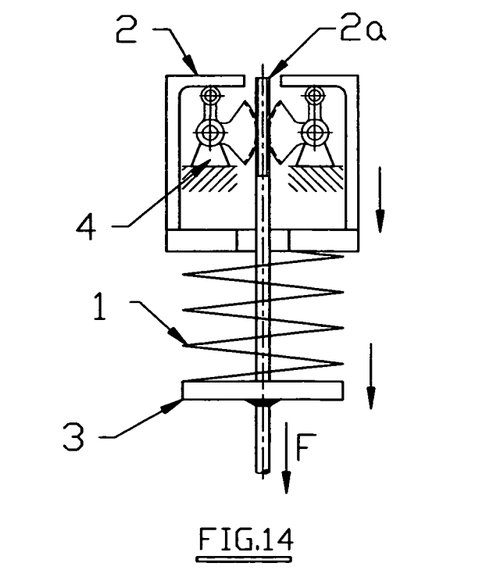
FIG. 14 is a view similar to FIG. 6 on an example of expansion spring.

On FIG. 13 & FIG. 14 are show examples of an embodiment of the main idea of the Invention on an example of an expansion spring. The function of parts are the same as on a compression spring.

On FIG. 13 when a force "F" is applied to the bottom seat plate 3 of the spring it starts to move down. Levers 5 start to rotate moving up the top seat plate, increasing the stiffness of the spring.

On FIG. 14 when the bottom seat plate starts to move down the top seat plate 2 also moves down, decreasing the spring constant.

Figures 15, 15A, 15B:
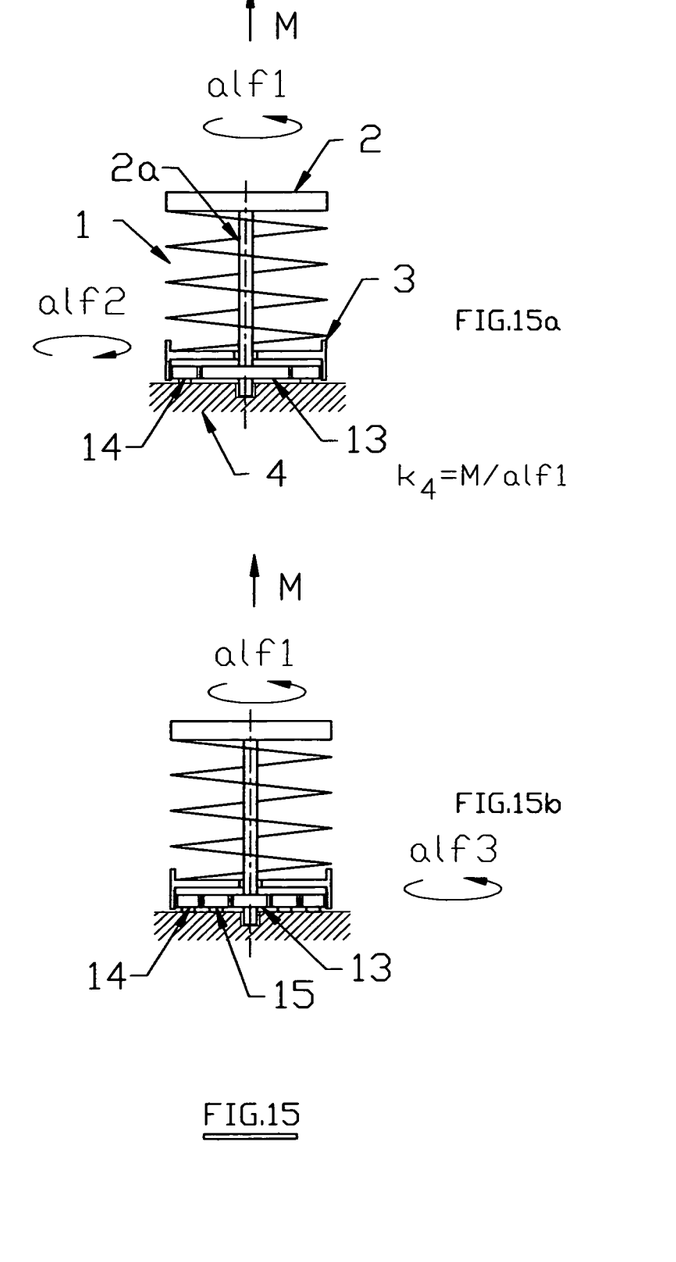
FIG. 15 shows the main idea of the Invention on an example of a torsion spring.

The example of embodiment of the New Spring on a torsion type of device is shown on FIG. 15. The spring constant is k4=M/alf1, where "M" is a moment exerted by a spring, "alf1" is an angle a spring is rotated. In a regular spring only a top seat plate rotates. In this example of the New Spring the top seat plate 2 connected to the bottom seat plate 3 and to the mount 4 by means of the part 2a and the gears 13, 14, and 15. So, when a moment "M" is applied to the top seat plate 2 it starts to rotate. The rotation will transfer to the bottom seat plate 3. On FIG. 15a we see the rotation of the bottom plate 3 to the opposite direction—the angle "alf2" (by means of the cogs 13 and 14, the bottom plate also has a cogs). In another words by applying the same moment to the spring we have the different (less) rotation of the top seat plate which gives us the "effect" of changing the spring constant. In this case we have the increasing of the spring constant. On FIG. 15b, on the contrary, we have the decreasing of the spring constant, because when the plate 2 starts to rotate the plate 3 will rotate in the same direction (angle "alf3') by means of the cogs 13, 14 and 15.

In all above embodiments of the Invention by enabling or disabling the linkage between a seat plates and a mount we can switch from a "regular" spring to a "different springs". On the example of the spring, shown on FIG. 3 it looks like the following. The top seat plate 2 is always connected to the arms 5a, but there is no direct connection between the parts 5a and parts 5b. Let's assume that at the beginning the parts 5a and 5b are disconnected. In this case when a force is applied to the top seat plate, the arms 5a just rotate. The bottom seat plate does not move. If in a certain moment, based on the data of an electronic sensor or for other reasons we need to change the spring constant, the parts 5a and 5b will be connected. Now the bottom seat plate starts to move up, changing the spring constant. Furthermore, by switching between a few parts 5b with different radiuses and locations of a contacting points "A" we can switch between a different "Springs" with a different spring constants. The same is true with the rest of the above springs also, except the constant spring, shown on FIG. 16 (see below). For an example, we can switch between a few different cams with different shapes in the spring, shown on FIG. 10 and FIG. 11 etc.

Figure 16:
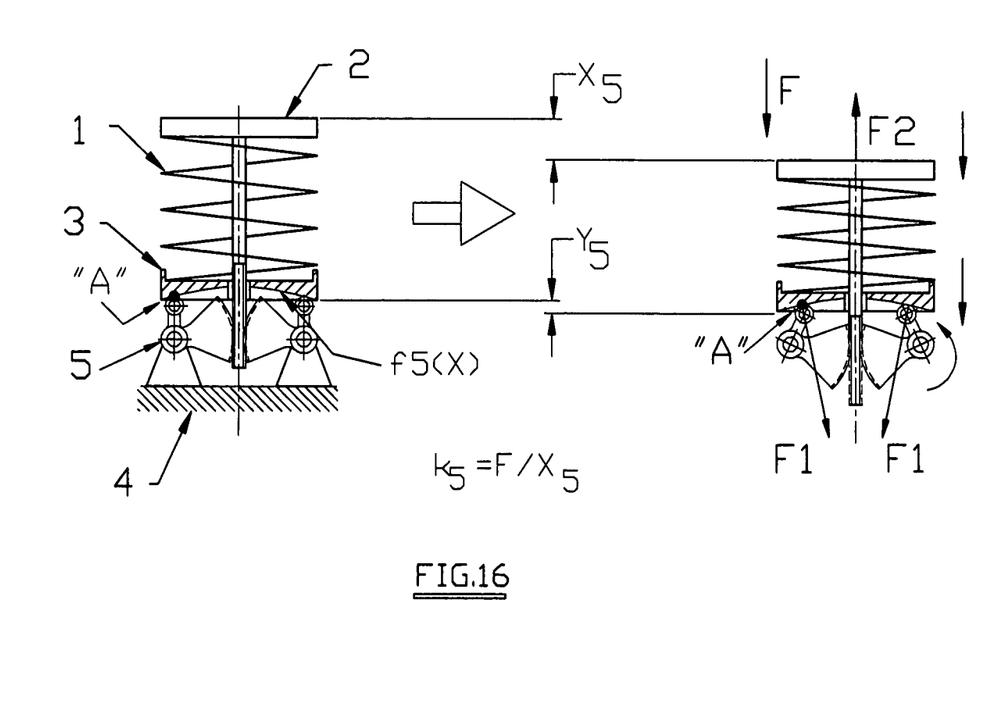
FIG. 16 shows an example of a Constant Spring, based on the Invention.

The following FIG. 16 explains how to achieve a constant spring. The new spring is based on the example of the embodiment, shown on FIG. 7. In this case the seat plates are connected permanently. When a force "F" is applied to the spring, the seat plate 2 starts to move down, levers 5 start to rotate, the bottom seat plate 3 starts to move down as well, decreasing the total movement of the spring. Now the spring movement is—"X5-Y5". Beside that the reaction forces of the spring are directed to opposite directions: force "F2" to up, force "F1" to down. So, resulting spring force F is less than in a "regular" spring. By choosing the radius of the parts 5, and the shape "f5(x)". of the bottom plate 3 we can achieve the constant spring.

Because all types of a springs have two seat plates the Invention works for all of them.

On FIG. 3 to FIG. 16 shown connections between a top and a bottom seat pates going through the inside of a spring. But this is not principal. All connections can be done outside a spring also, making room, for example, for shock absorber in a case when a spring in used in certain king of a vehicle suspensions.

There could be another ways of implementing the ideas of the Invention as well.

The invention claimed is:

1. A spring comprising:
   (a) a first end seat plates;
   (b) a second end east plate with a hole in the center;
   (b) a spring mount (load supporting member);
   (c) a spring coil, located between said first and said second end seat plates;
   (d) a gear rack fixed to said first seat plate and going through the hole in said second seat plate;
   (e) a cams with cogs, gears, or gears with arms, located between said second seat plate and said spring mount and pivotally connected to said spring mount and engaged to the cogs of said gear rack
   so when a force or moment is applied to one of said seat plates its movement induces the movement of said second seat plate as well, changing the total deflection of said spring coil, so by controlling the linkage between said first and second seat plates and said spring coil the spring constant can be controlled as to be adjustable.

2. The spring as recited in claim 1 in which said system further comprises:
   (a) a surface of said second seat plate adjacent to the said cam, said gears or said gears with arms is made convex for further adjustment of the spring constant (make it higher) or concave for further adjustment of the spring constant (make it lower).

* * * * *